(12) United States Patent
De Baets et al.

(10) Patent No.: US 8,062,728 B2
(45) Date of Patent: Nov. 22, 2011

(54) COMPOSITE MATERIAL FORMED FROM FOAM FILLED HONEYCOMB PANEL WITH TOP AND BOTTOM RESIN FILLED SHEETS

(76) Inventors: Alan Daniel De Baets, Winnipeg (CA); Paul J. Dagesse, Beaverlodge (CA)

(*) Notice: Subject to any disclaimer, the term of this patent is extended or adjusted under 35 U.S.C. 154(b) by 481 days.

(21) Appl. No.: 12/355,827

(22) Filed: Jan. 19, 2009

(65) Prior Publication Data
US 2009/0286043 A1 Nov. 19, 2009

Related U.S. Application Data

(60) Provisional application No. 61/053,170, filed on May 14, 2008.

(51) Int. Cl.
*B32B 3/12* (2006.01)
*B32B 3/26* (2006.01)

(52) U.S. Cl. ............ 428/117; 428/118; 428/306.6; 428/308.4; 428/311.11

(58) Field of Classification Search .......... 428/117, 428/118, 306.6, 308.4, 311.11
See application file for complete search history.

(56) References Cited

U.S. PATENT DOCUMENTS

| | | | |
|---|---|---|---|
| 2,430,200 A | 11/1947 | Wilson | |
| 3,348,459 A | 10/1967 | Harvey | |
| 3,564,801 A | 2/1971 | Huerta | |
| 3,602,110 A | 8/1971 | Wiggins | |
| 3,694,983 A | 10/1972 | Couquet | |
| 3,859,000 A | 1/1975 | Webster | |
| 4,703,597 A | 11/1987 | Eggemar | |
| 4,845,907 A | 7/1989 | Meek | |
| 5,032,037 A | 7/1991 | Phillips et al. | |
| 5,797,237 A | 8/1998 | Finkell, Jr. | |
| 5,971,655 A | 10/1999 | Shirakawa | |
| 6,652,183 B2 | 11/2003 | Stasiewich et al. | |
| 6,676,785 B2 | 1/2004 | Johnson et al. | |
| 7,415,741 B1 | 8/2008 | Wasley et al. | |
| 7,608,313 B2 | 10/2009 | Solomon et al. | |
| 7,641,963 B2 | 1/2010 | Grafenauer | |
| 2003/0233809 A1 | 12/2003 | Pervan | |
| 2007/0250025 A1 | 10/2007 | Sams et al. | |
| 2009/0142542 A1 | 6/2009 | Halahmi et al. | |

*Primary Examiner* — Ling Xu
(74) *Attorney, Agent, or Firm* — Adrian D. Battison; Ade & Company Inc.

(57) ABSTRACT

A composite panel is formed from a honeycomb core panel with a foam material filling the tubular cells and a fibrous reinforcing cover sheets extending over the top and bottom of the panel. The cover sheets are filled with a set resin material which extends from the cover sheets into the porous fibrous material of the walls of the core panel so as to form an integral structure of the resin extending between the walls and the sheets.

10 Claims, 1 Drawing Sheet

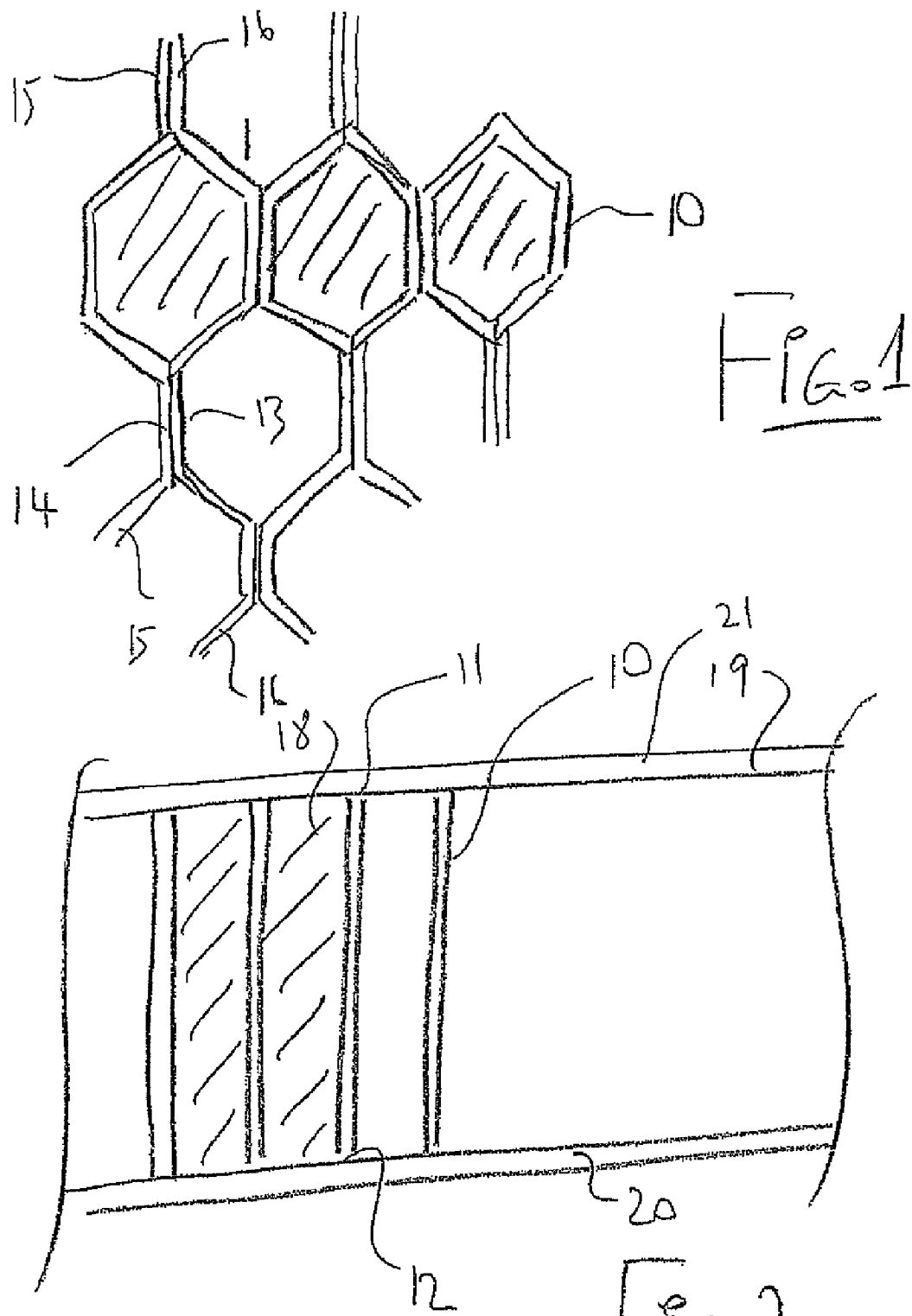

COMPOSITE MATERIAL FORMED FROM FOAM FILLED HONEYCOMB PANEL WITH TOP AND BOTTOM RESIN FILLED SHEETS

This application claims the benefit under 35 U.S.C. 119 of Provisional Application 61/053,170 filed May 14, 2008.

This invention relates to a composite material formed from a panel of a foam filled honeycomb cell material covered on top and bottom surfaces by a resin filled sheet.

BACKGROUND OF THE INVENTION

A number of prior proposals have been made for manufacturing a composite core panel formed from a honeycomb panel formed with tubular cells at right angles to the panel where the panel is filled with a reinforcing foam extending through the cells so as to provide an enhanced compression strength of the core in a direction longitudinally of the cells. This strength is commonly significantly greater than the compression strength of the core and the foam separately. The core panel is then covered on top and bottom by reinforcing sheets of a fibrous reinforcing material which are then resin filled by a resin impregnation process, for example infusion, so as to attach the top and bottom sheets to the foam and honeycomb core panel. The compression strength of the core panel has a direct relationship to the shear strength of the finished panel so that it has been desirable to maximize this compression strength. Such panels have become widely used for many products The materials commonly used for the honeycomb panel are phenolic paper, aluminum and various types of plastic materials. The selection is made in part dependant on cost relative to the desired strength with the aluminum of course providing the highest strength at the highest cost. Phenolic paper is the simplest and cheapest option and is very widely used. The honeycomb, in many cases, is formed by bonding strips side by side with the tubular cells formed around rods or simply by stretching the bonded strips longitudinally of the panel to open them up. Adhesive and heat sealing can be used for attaching the strips.

However there is always an ongoing requirement for yet further increasing the strength of such panels to enable additional markets to be entered or for strength requirements to be met with a thinner panel of less material.

SUMMARY OF THE INVENTION

It is one object of the invention to provide a panel of the above type.

According to one aspect of the invention there is provided a composite panel comprising:

a honeycomb core panel having a first face and a second opposite face with an array of generally hexagonal tubular cells defined by walls of the core panel extending between the first and second faces;

a foam material filling the tubular cells;

a first fibrous reinforcing cover sheet extending over the first face of the core panel;

a second fibrous reinforcing cover sheet extending over the second face of the core panel;

the first and second cover sheets being filled with a set resin material;

the walls of the honey comb core panel being formed from a porous fibrous material;

the set resin in the cover sheets extending from the cover sheets into the porous fibrous material of the walls of the core panel so as to form an integral structure of the resin extending between the walls and the face sheets.

Preferably the resin substantially fills the material of the core walls and preferably the resin extends through the core walls from the first sheet to the second sheet. However the first intention is that the resin acts firstly to form an integral connection between the layer defined by the face sheets and the core walls so as to provide and increased resistance to shear forces tending to delaminate the structure at the junction between the sheet and the core. Hence, it will be appreciated that, in order to achieve this requirement, the resin may not extend fully through the structure to form the tubular reinforcement. Thus other resins can be used in the core material provided they do not interfere with the formation of the integral connection.

Secondly the intention is that the resin forms an increased compression resistance in the core panel by forming a series of resin reinforced tubes through the panel at the walls. Hence, it will be appreciated that, in order to achieve this requirement, the resin may not extend fully into each and every pore or space in the walls but the resin will extend into the structure sufficiently to form the integral connection at the sheets and the tubular reinforcement extending through the panel.

It will be appreciated that the walls generally do not contain any existing resin filling material when the resin introduction occurs since this will prevent or inhibit the penetration of the resin into the walls and the formation of the tubular structures through the panel and the integral connection to the sheets. However the walls may contain some reinforcing resin provided it does not prevent the formation of the integral connection.

Preferably the resin is a thermosetting resin such as thermosetting polyester. However other types of resin can be used such as polyurethane or epoxy, vinyl ester, phenolic resin.

Preferably the walls are connected each to the next to form the honeycomb panel by a heat seal. This is preferred as the heat seals are less likely to interfere with the entry of the resin during the resin introduction process and are easier to effect and less expensive. However adhesive connection may be used.

Preferably the walls are formed from a non-woven fibrous material such as a spun bond fibrous plastics material. However the material selected can be of any construction provided it is porous so as to allow the penetration of the resin during the resin introduction step. Thus of course aluminum and plastics film cannot be used. The material should also bond to the foam during the foam filling step. The compressive strength of the material in the honeycomb construction is of less importance and can be quite low in comparison with other materials, such as those conventionally used, provided it is sufficient to allow the foam filling step to occur.

Preferably the sheets contain glass reinforcing fibers as these are inexpensive and are known to provide the required strength characteristics. However other reinforcing fibers can be used.

One particular end use for panels of the present invention is that used for a panel of a rig mat that is a panel which when connected edge to edge with other panels forms a ground cover for heavy equipment and the like without the need to pave. Such rig mats for heavy equipment and lighter mats for persons and lighter equipment are very widely used in the oil and similar industries. However other end uses of the stronger panels of the present invention are in the fields of marine (boat hull, transom, stringer, bulkhead, decks), wind energy, sporting/recreational applications (skis, snowboards,), Transportation (heavy equipment such as trucks, tractors, buses, RV, automotive), load bearing panels for construction of buildings, modular housing, flooring.

While the term "honeycomb" is used generally and in this document it will be appreciated that the tubular cells formed are generally not accurately hexagonal in cross-section, particularly where, as described herein, the cells are formed from a porous fibrous material without reinforcing resin available during the filling process to maintain a regular shape of the cells.

BRIEF DESCRIPTION OF THE DRAWINGS

One embodiment of the invention will now be described in conjunction with the accompanying drawings in which:

FIG. 1 is horizontal cross sectional view through a panel according to the present invention.

FIG. 2 is a vertical cross sectional view through the panel of FIG. 1.

In the drawings like characters of reference indicate corresponding parts in the different figures.

DETAILED DESCRIPTION

The composite panel described in general above is shown in FIGS. 1 and 2 and is formed by a honeycomb core panel 10 having a first face 11 and a second opposite face 12 with an array of generally hexagonal tubular cells defined by walls of the core panel extending between the first and second faces. The cells are formed from strips 15, 16 arranged side by side of a porous fibrous material which is heat sealed at a sealing line 14 to define the generally hexagonal cells.

A foam material such as a polyurethane foam 18 fills the tubular cells.

A first fibrous reinforcing cover sheet such as a fiberglass mat (or carbon fiber, aramid fiber, Kevlar fiber, polyester fiber, natural fiber—e.g. hemp, flax, straw) 19 extends over the first face 11 of the core panel and a second fibrous reinforcing cover sheet 20 extends over the second face of the core panel.

The first and second cover sheets are filled with a set resin material 21 which extends from the cover sheets 19, 20 into the porous fibrous material of the walls 15, 16 of the core panel so as to form an integral structure of the resin extending between the walls and the sheets.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A composite panel comprising:
   a honeycomb core panel having a first face and a second opposite face with an array of generally hexagonal tubular cells defined by walls of the core panel extending between the first and second faces;
   a foam material filling the tubular cells;
   a first fibrous reinforcing cover sheet extending over the first face of the core panel;
   a second fibrous reinforcing cover sheet extending over the second face of the core panel;
   the first and second cover sheets being filled with a set resin material;
   the walls of the honey comb core panel being formed from a porous fibrous material;
   the set resin in the cover sheets extending from the cover sheets into the porous fibrous material of the walls of the core panel so as to form an integral structure of the resin extending between the walls and the sheets.

2. The composite panel according to claim 1 wherein the resin substantially fills the core walls.

3. The composite panel according to claim 1 wherein the resin extends through the core walls from the first sheet to the second sheet.

4. The composite panel according to claim 1 wherein the resin is a thermosetting resin.

5. The composite panel according to claim 1 wherein the resin is polyester.

6. The composite panel according to claim 1 wherein the walls are connected each to the next to form the honeycomb panel by a heat seal.

7. The composite panel according to claim 1 wherein the walls are formed from a non-woven fibrous material.

8. The composite panel according to claim 1 wherein the walls are formed from a spun bond fibrous plastics material.

9. The composite panel according to claim 1 wherein the sheets contain glass reinforcing fibers.

10. The composite panel according to claim 1 when used for a panel of a rig mat.

\* \* \* \* \*